US008175117B2

(12) United States Patent
Marchetto et al.

(10) Patent No.: US 8,175,117 B2
(45) Date of Patent: *May 8, 2012

(54) METHOD AND SYSTEM OF DATA PACKET TRANSMISSION TIMING FOR CONTROLLING BANDWIDTH

(75) Inventors: Jarno Marchetto, Genestrario (CH); La Cognata Emanuelo, Blanca (CH)

(73) Assignee: Darby & Mohaine, L.L.C., Wilmington, DE (US)

( * ) Notice: Subject to any disclaimer, the term of this patent is extended or adjusted under 35 U.S.C. 154(b) by 109 days.

This patent is subject to a terminal disclaimer.

(21) Appl. No.: 12/269,023

(22) Filed: Nov. 11, 2008

(65) Prior Publication Data

US 2009/0262755 A1 Oct. 22, 2009

Related U.S. Application Data

(63) Continuation of application No. 10/062,830, filed on Jan. 31, 2002, now Pat. No. 7,539,756.

(51) Int. Cl.
*H04J 3/16* (2006.01)
(52) U.S. Cl. ........................................ 370/470
(58) Field of Classification Search .. 370/395.4–395.43, 370/468, 470, 473
See application file for complete search history.

(56) References Cited

U.S. PATENT DOCUMENTS

| 4,771,391 | A |   | 9/1988  | Blasbalg                |
|-----------|---|---|---------|-------------------------|
| 5,867,230 | A |   | 2/1999  | Wang et al.             |
| 5,982,771 | A |   | 11/1999 | Caldara et al.          |
| 5,982,778 | A |   | 11/1999 | Mangin et al.           |
| 5,995,488 | A | * | 11/1999 | Kalkunte et al. 370/232 |
| 6,041,059 | A |   | 3/2000  | Joffe et al.            |
| 6,081,507 | A |   | 6/2000  | Chao et al.             |
| 6,118,787 | A |   | 9/2000  | Kalkunte et al.         |
| 6,144,637 | A |   | 11/2000 | Calvignac et al.        |
| 6,198,743 | B1|   | 3/2001  | Giroux et al.           |
| 6,215,767 | B1|   | 4/2001  | Li                      |
| 6,249,530 | B1|   | 6/2001  | Blanco et al.           |
| 6,298,041 | B1|   | 10/2001 | Packer                  |

(Continued)

FOREIGN PATENT DOCUMENTS

EP    1126666 A2    8/2001

(Continued)

OTHER PUBLICATIONS

Features Overview, Maximizing the Power of E-Business, Version 0.8 (3 pages; undated).

(Continued)

*Primary Examiner* — Kwang B Yao
*Assistant Examiner* — Tung Q Tran
(74) *Attorney, Agent, or Firm* — Perkins Coie LLP

(57) ABSTRACT

A method and system for determining a wait time ($t_w$) to be used between successive transmissions of packets of a content to achieve a selected target bandwidth $B_T$ for the transmission. The wait time between successive packets of a content being transmitted is determined as a function of the selected target bandwidth ($B_T$) to be achieved during the transmission and the size (P) of the packets based on the algorithm $$t_w = \frac{P}{B_T}$$

The invention provides bandwidth control at the source (the sending device) without relying on network Quality of Service (QoS) facilities.

27 Claims, 9 Drawing Sheets

U.S. PATENT DOCUMENTS

| | | | |
|---|---|---|---|
| 6,320,846 B1 | 11/2001 | Jamp et al. |
| 6,330,700 B1 | 12/2001 | Morris et al. |
| 6,377,550 B1 | 4/2002 | Prasad |
| 6,408,005 B1 | 6/2002 | Fan et al. |
| 6,459,704 B1 | 10/2002 | Jandrell |
| 6,504,824 B1 | 1/2003 | Tanaka et al. |
| 6,560,243 B1 | 5/2003 | Mogul |
| 6,625,122 B1 | 9/2003 | Joffe |
| 6,681,255 B1 | 1/2004 | Cooper et al. |
| 7,401,155 B2 | 7/2008 | Cooper et al. |
| 7,539,756 B2 | 5/2009 | Marchetto et al. |
| 2001/0024452 A1 | 9/2001 | Liu et al. |
| 2002/0103915 A1 | 8/2002 | Shuster |
| 2002/0159480 A1 | 10/2002 | Sekihata et al. |
| 2003/0103450 A1 | 6/2003 | Chapman et al. |
| 2004/0076173 A1 | 4/2004 | Marchetto |
| 2004/0210589 A1 | 10/2004 | Cooper et al. |

FOREIGN PATENT DOCUMENTS

| | | | |
|---|---|---|---|
| JP | 06318955 A | 11/1994 |
| JP | 10145383 A | 5/1998 |
| JP | 11004225 A | 1/1999 |
| JP | 11032078 A | 2/1999 |
| JP | 2001168871 A | 6/2001 |
| JP | 2003169090 A | 6/2003 |
| WO | WO-0128161 A1 | 4/2001 |

OTHER PUBLICATIONS

Bandwidth Management, Optimizing the User Experience, Version 0.8 (4 pages; undated).

Li and Ammar, "Bandwidth Control for Replicated-Stream Multicast Video Distribution," College of Computing, Georgia Institute of Technology, Atlanta, GA (8 sheets; undated).

NEC CX Series: "White Paper on IP QoS Control" (5 sheets; printed Jan. 15, 2002).

Solutions: "The NetEnforcer in a Satellite Environment" (5 sheets; printed Jan. 15, 2002).

News Release: "Session QoS Techniques for Video Delivery on the Internet" (4 sheets; printed Jan. 15, 2002).

Paul Farrell, "2.2 Gigabit Ethernet Technology" (3 sheets; printed Jan. 15, 2002).

Miyoshi et al., "ATM Cell Output Method for ABR," Paper presented at Electronic Information Communication Society Conference B-636, Japan, 1996.

Gelenbe, E., "Bandwidth Allocation and Call Admission Control in High-Speed Networks," Communications Magazine, IEEE, vol. 35, issue 5, May 1997, part 1, pp. 122-129.

* cited by examiner

METHOD AND SYSTEM OF DATA PACKET TRANSMISSION TIMING FOR CONTROLLING BANDWIDTH

CROSS-REFERENCES TO RELATED APPLICATIONS

This application is a continuation application of commonly assigned U.S. patent application Ser. No. 10/062,830, filed on Jan. 31, 2002, and entitled "METHOD AND SYSTEM OF DATA PACKET TRANSMISSION TIMING FOR CONTROLLING BANDWIDTH," which is hereby incorporated herein in its entirety by reference.

FIELD OF THE INVENTION

The invention relates to a method and system for timing the transmission of data packets from a sender device to one or more receiving devices, for achieving bandwidth control.

BACKGROUND OF THE INVENTION

In performing data transmission using various media such as cable, telephone line, satellite communication, etc., it is conventional for the data to be sent from one device to other devices. The data is first fragmented, or segmented, into packets and then the packets transmitted, or broadcast. The term "packet" is used to indicate a sequence of bytes and represents the smallest unit of transmission and reception. Hereafter, a "device" is defined as a hardware element with a software component capable of receiving and/or transmitting data packets. Examples of such devices include computers, GPRS mobile phones and network equipment.

The term "content", as used herein, indicates data that is segmented into a sequence of packets. The data contained within the content could be a file, or part of a file, part of a data stream, or any collection of data. The content can be of pure data, or audio and video data streams, or of any combination. The content is sent in sequentially transmitted packets from a sender device to one or more receiving devices.

The sending and receiving devices typically run software programs, whose purpose at the sender device is to fragment the content to be sent into packets, and at the receiver device to reassemble the packets received into the original content.

Bandwidth is defined as the amount of data that can be transmitted over the media in a given time frame, for example, 10 Mbps (10 million bits per second). Essentially, this is the speed of the transmission, that is, the speed at which data is sent from the sending device to the receiving devices. Each transmitting-receiving system has a certain bandwidth capability that is defined by various factors, such as the type of media used for the transmission and equipment used for transmission and reception of the data. For example, a broadband cable medium has a larger bandwidth capability than a telephone line.

Various types of protocols are used to transmit the data packets forming the content. Some protocols may be considered to be "unreliable", herein meaning any transmission protocol that provides best-effort delivery of packets, and in particular, does not perform automatic re-transmission of lost or corrupted packets. Examples of "unreliable" protocols currently in common use include unicast and multicast User Datagram Protocol (UDP), ATM Adaption Layer (AAL) Types 3/4 and 5 in non-assured transmission mode, AppleTalk DDP datagrams, and unicast and broadcast MPEG-2 transport streams.

Often, data from different files is to be transmitted at the same time over the same media. For example, if a particular system has a 10 Mbps bandwidth transmission capability, the packets of two different contents can be transmitted at the same time in separate streams, for example, each stream of 5 Mbps bandwidth. In various commercial applications, portions of the available bandwidth of a given media are sold or licensed to different customers for use at the same time.

Some applications require that packets are to be received in a regular and timely fashion, for example, for audio and video transmissions in which it is important that the jitter (i.e., the amount of variation in the end-to-end packet transit time) is kept as low as possible. Increasing reliability at the receiving device implies use of a high precision control of the bandwidth at the sending device, especially for broadband applications.

In general, the bandwidth usage of a broadcast application is selected according to network load and speed, leased bandwidth capacity, and processing speed of the receiving device. The bandwidth allocated for a given transmission is hereafter referred to as the "target bandwidth". During the transmission, the actual bandwidth used can vary relative to the selected target bandwidth.

As the broadcast takes place, the bandwidth varies and can be measured at any time. "The instantaneous" bandwidth is the bandwidth measured in the shortest measurable time. For example, if the bandwidth usage can be regularly checked at most once per second, the instantaneous bandwidth is computed by dividing the quantity of data transferred in that time frame (in this case 1 second) by that time interval.

The broadcast of the content has an "average (or mean) bandwidth". This is the total amount of data transmitted during a transmission divided by the transmission duration. The terms "mean bandwidth" and "average bandwidth" are used interchangeably herein.

Since the content is transmitted in packets, there is a pause, or wait time, between the start of transmission of successive packets. The wait time between packets is related to the bandwidth used during transmission of a content. For example, increasing the wait time between packets while maintaining a fixed packet size results in less data transmitted during a given time, and vice versa.

If data is sent without a precise bandwidth control, various problems can arise. Basically, there are three different scenarios that can cause trouble:

(1) the average bandwidth is too high relative to the target bandwidth value;

(2) the average bandwidth is too low relative to the target bandwidth value;

(3) the average bandwidth is equal, or very close, to the target bandwidth, but the instantaneous bandwidth values measured during the transmission are different from the target bandwidth. This type of transmission is hereafter referred to as heterogeneous, i.e., contains peaks.

The problems caused by the different scenarios described above can adversely affect different components and structures of the system that receive the data, such as routing and switching devices and the destination receiver devices. This is described below.

(1) Sending data packets too fast. Broadcasting of the data at a speed above the target bandwidth usually results in substantial packet losses. Loss of packets reduces the integrity of the data transmission. Also, too high a transmission speed can cause congestion if routing devices are not able to buffer the incoming data stream. The same problem can affect encapsulators if data is sent to a satellite uplink. Here, entire series of packets can be lost. At the receiving device side, packet reassembly can be difficult if the hardware or application program processing the received data is not designed for an incoming data stream speed higher than the bandwidth mean (average) value. Moreover, a local area network (LAN) to which the receiving devices are connected can experience congestion if no traffic buffering mechanism is provided between the data transmitter and the receiving devices.

(2) Sending data packets too slow. If the packets are transmitted at a speed lower than the specified target bandwidth, no losses of data packets should be experienced. However, a resource waste is caused, especially if the connection between the data transmitter and receiving devices is purchased on a bandwidth usage basis instead of on a transmitted data amount basis. Also, audio and video streaming quality can be affected if the receiving data rate is too low. That is, the received sound and video will be intermittent, garbled, or otherwise distorted (3) Peaks in bandwidth usage. Even when the average output transmission bandwidth is close to the target bandwidth does not always guarantee that the data stream will be free of problems. For example, there can be bandwidth usage peaks at any instant during transmission. Also, if the packets are not homogeneously distributed during the transmission, i.e., a fairly constant time between the successive packets, packet clustering occurs that causes an increase or decrease of the bandwidth used at a given instant, this being the instantaneous bandwidth. As a result, the same problems described above for transmissions with mean bandwidth higher or lower than the target bandwidth can arise, although the adverse affects are experienced to a lesser degree.

Accordingly, it would be desirable to be able to better control the bandwidth usage for the transmission of packets containing any type of content. Prior attempts to solve the various problems discussed above typically enforce a maximum bandwidth. That is, the transmission protocol is such so as to intervene when a maximum value bandwidth is exceeded, but do not intervene when the bandwidth usage is lower than the maximum. Other existing solutions correct existing traffic streams. That is, a protocol is used to solve congestion problems caused by senders without inbuilt traffic control. Still other existing solutions discard packets when buffer space is exceeded. Some of the solutions of this type discard packets using an algorithm, such as the "leaky bucket" algorithm (Tanenbaum, Computer Networks, 3$^{rd}$ Edition, p. 380, Prentice Hall). Other solutions permit a certain amount of burstiness in the output stream using an algorithm such as the "token bucket" algorithm (Tanenbaum, p. 381).

BRIEF DESCRIPTION OF THE INVENTION

In accordance with the invention, it has been discovered that the bandwidth can be held more closely to a desired target bandwidth value if the pause (wait time) between the successive packets is properly selected and the packets are transmitted using the selected wait time during the transmission of the content. A novel method and system are provided that determines and maintains the wait time between packets in response to selected input parameters of desired target bandwidth and size of the packets.

The method and system of the invention operate to transmit the data in a manner to control the bandwidth for the transmission of content by controlling the pause, or wait time, between the packets of the data stream. As part of the method and system, a novel algorithm has been developed and is implemented that relates the desired size (P) of the packets of a content to be transmitted to a desired target bandwidth ($B_T$) by selecting and controlling the wait, or pause, time pause ($t_w$), between the transmission of the packets. The invention can be implemented in software and/or hardware.

In a preferred embodiment of the invention, the precision of the bandwidth control is maximized by the use of the highest resolution clock or other timing device available at the sending device. This provides the best compensation for wait time rounding errors.

In a preferred embodiment of the invention, the wait time between packets is calculated based on a fixed packet size and target bandwidth.

The invention does not require or use feedback from the receiver devices. Therefore, it can be used for unicast, multicast and broadcast transmissions and with simplex, half-duplex and full-duplex media.

As compared to the existing transmission problem solutions discussed above, the invention causes data flow to tend towards target bandwidth, decreasing or increasing transmission speed as necessary. Also, the invention provides traffic control at the source so that the outgoing traffic is smoothly distributed and tends towards the target bandwidth. Further, the invention prevents excess packets by introducing pauses between packets, blocking the sender until the next packet is to be transmitted and never discards packets. Also, the present invention maintains a constant bandwidth usage with minimal burstiness.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
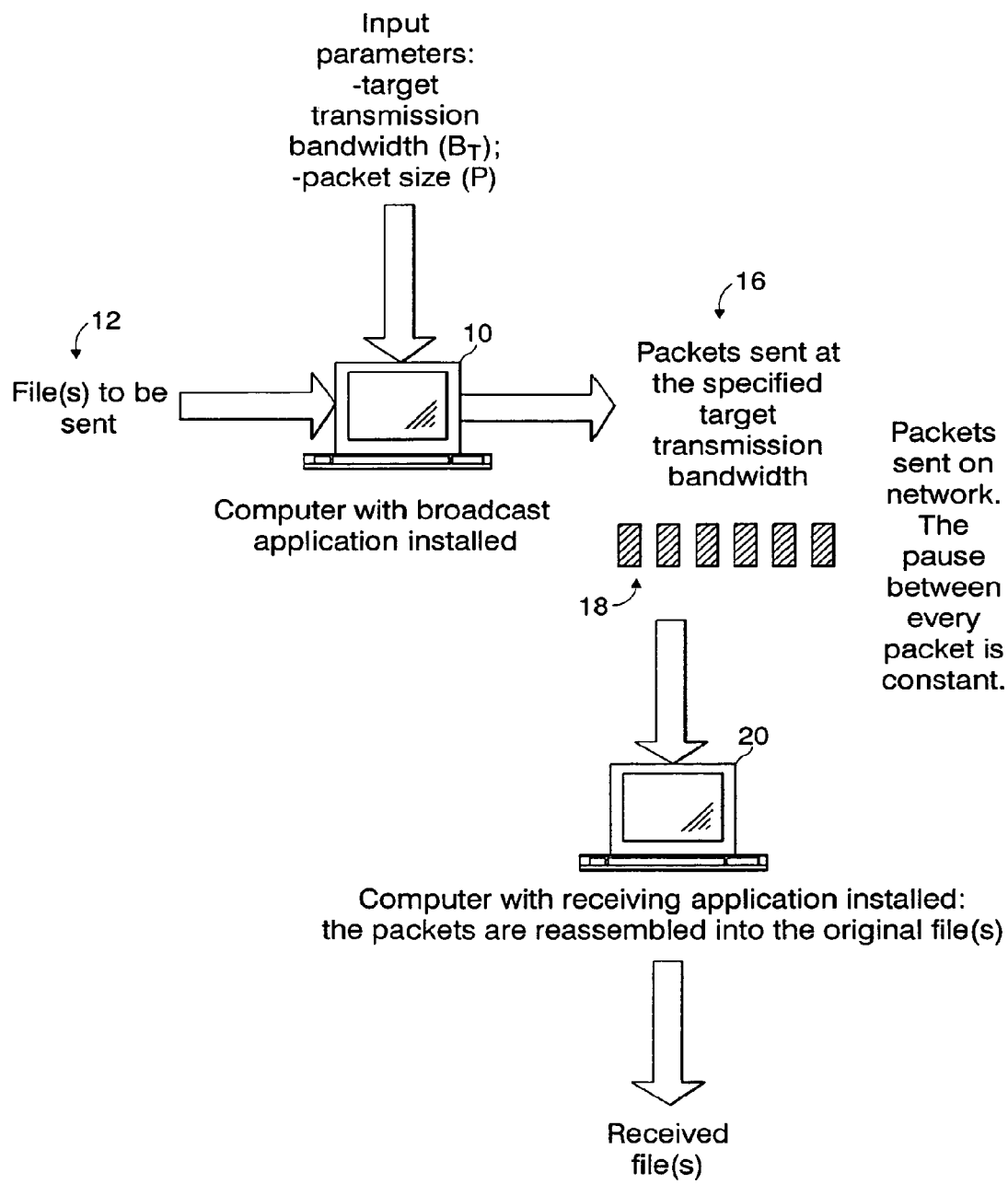
FIG. 1 is a schematic diagram of a system implementation of the invention.

In the transmission of data packets, bandwidth is usually defined as the amount of data transmitted in a given time frame. Bandwidth control refers to the capability to control the bandwidth, i.e., the rate of transmission for a given amount of data. A significant value to evaluate bandwidth control quality is the mean (or average) bandwidth $B_M$, that is, the arithmetic mean value about which the actual transmission rate centers during the entire transmission. The target bandwidth $B_T$ is defined as the needed (selected) bandwidth for a given content transmission. In some cases, $B_T$ is an amount of bandwidth that is sold or leased to a content producer by a broadcast facility.

If $B_T$ is known, the mean bandwidth $B_M$ can be defined by the following equation:

$$(B_T-\epsilon)<B_M<(B_T+\epsilon) \qquad \text{(Equation 1-1)}$$

where
$B_T$=the target bandwidth
$B_M$=mean bandwidth
$\epsilon$=error or deviation of $B_M$ from $B_T$ The main goal of bandwidth control is to minimize the error $\epsilon$ between $B_M$ and $B_T$. To consider it from another perspective, E is the percentage error of the mean of the bandwidth actually transmitted relative to the desired target bandwidth $B_T$, expressed in percentage terms as:

$$E = \frac{\varepsilon}{B_T} \cdot 100\% \qquad \text{(Equation 1-2)}$$

It is also important to consider the amount of data transmitted in a fixed time window smaller than the time needed for the transmission of a complete content, that is, the instantaneous bandwidth, and to compare this value during the entire content transmission with the target bandwidth. This is necessary because if the instantaneous bandwidth values are largely different from the target bandwidth, the data transfer rate is oscillating, that is, the transmission is heterogeneous. This can happen even if the mean bandwidth $B_M$ is equal or very near to the target bandwidth $B_T$.

This heterogeneity in the bandwidth usage can be very difficult to manage at the receiving end, for routers and other routing devices, especially where the allowed target bandwidth $B_T$ is fixed and cannot be exceeded, e.g., in the case of transmission of data by satellite transmissions.

A "constant" bandwidth can be theoretically obtained if the difference between the instantaneous bandwidth (measured in a time frame $\Delta t$), and the target bandwidth $B_T$ tends to zero in a time t during the transmission. That is:

$$(B_T-\epsilon)<B_{[t,t+\Delta t]}<(B_T+\epsilon) \qquad \text{(Equation 1-3)}$$

with $\epsilon$ and $\Delta t$ tending to zero, and
$t_{start}<t<t_{end}$, and where
$t_{start}$: transmission start time;
$t_{end}$: transmission end time;
$\Delta t$: measurement time frame, which must be less than the transmission duration;
$B_{[t,t+\Delta t]}$: instantaneous bandwidth B measured in the interval included between t and t+$\Delta t$.

The above is only a theoretical situation, not reproducible in the real world. Nevertheless, the bandwidth control described here is designed to approach as near as possible to this ideal solution, using the maximum precision supported by the sending device.

Another parameter that can be considered is the transmission burstiness, defined as:

$$\text{Burstiness} = \frac{B_{peak}}{B_M} \qquad \text{(Equation 1-4)}$$

where $B_M$ is the mean bandwidth of a transmission content, and $B_{peak}$ is the highest of the absolute instantaneous bandwidth values measured during a transmission. That is:

$$B_{peak}=\max(B_{[t,t+\Delta t]}) \qquad \text{(Equation 1-5)}$$

Ideally, the burstiness should tend to one. That is, the bandwidth being used should be centered at $B_T$. Note also that under the same conditions of burstiness, the transmission heterogeneity could be different, since no information is provided in this value about the recurrence of $B_{peak}$. In fact, the burstiness value says how large the peak is relative to the mean transmission bandwidth $B_M$, but not how many times the peak is repeated during a transmission. That is, a transmission can experience 1 or 1000 peaks, but the value $B_{peak}$ is the same in most or all cases. Also, no information is provided about the heterogeneity of the transmission, that is, about the peak frequency.

Application programs making use of unreliable network protocols such as the User Datagram Protocol (UDP) for transmissions typically are not able to specify a target bandwidth $B_T$ for a given transmission. As a consequence of the absence of direct control, data is sent at the maximum bandwidth allowed by the network interface. When the program communicates the instruction of sending a content to the network card, that content is sent at the maximum speed (bandwidth) allowed by the network card. For example, if the network card can handle 10 Mbps bandwidth, the content is fragmented into packets and these are sent at 10 Mbps on the network; there is no application level control.

In accordance with the invention, a wait, or paresidual time is imposed between successive packets of the transmission in order to control bandwidth usage and to achieve the selected target bandwidth $B_T$. The method and system of the invention achieves bandwidth control by introducing this pause, in order that the average transmission bandwidth $B_M$ is as near as possible to the target bandwidth $B_T$. Also, all of the "instantaneous" bandwidth values measured during the transmission of the content are made to occur as closely as possible to the target bandwidth $B_T$. For this reason, a high precision is needed in timing the time between packets, and the timing preferably should be as precise as possible. The needed precision needed for the wait time depends on the target transmission bandwidth $B_T$. As described below, the higher the value of the target bandwidth $B_T$, the greater the control of the precision of the pause between packets should be in order to maintain the deviation E from the target bandwidth to acceptable values for practical use.

Consider the following example of dividing the data of a content to be transmitted into packets of e.g. 8192 Bytes, and needing to transmit a fixed amount of data at a target bandwidth $B_T$=10 Mbps. This computes as the wait time, or pause, between every transmitted packet being 6.5536 milliseconds (8192 Bytes=8192*8=65536 bits. 10 Mbps=10000000 (ten millions) bits per second. Dividing 65536 by 10000000=>wait time (between packets)=0.0065536 seconds=6.5536 milliseconds). If the precision of the time measuring system for determining the wait time between packets is one millisecond, e.g., a one millisecond clock, then this time value has to be rounded down or up from the computed 6.5536 millisecond value so that the wait time will be 6 or 7 milliseconds. The rounding to 6 or 7 milliseconds will produce respective errors of −6.38% or 9.23% in average bandwidth usage from the specified $B_T$=10 Mbps. This example illustrates the need for a precise computation of the wait time intervals between packets during broadcasting. To ensure that the average bandwidth $B_M$ is equal to the target bandwidth $B_T$, theoretically the wait time must not be rounded. In practice, in some cases, this value must be rounded, due to software and hardware limitations. As described below, it is preferred that the highest precision supported by the sender device be used, and therefore that the achieved bandwidth control is optimized for the software and hardware configuration employed.

Figure 4:
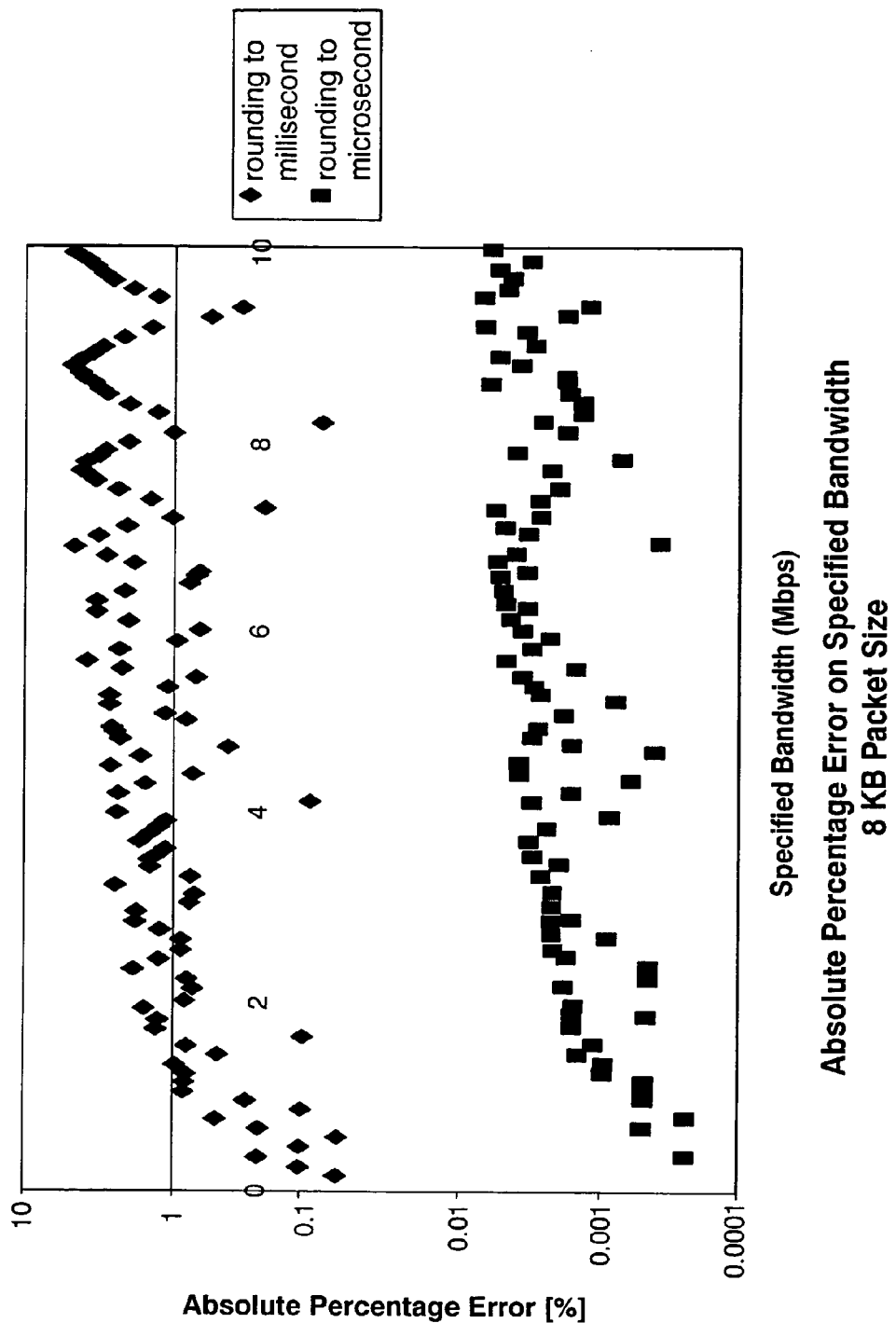
FIG. 4 is a diagram showing percentage error relative to a specified target bandwidth for an exemplary transmission bandwidth of up to 10 Mbps.

As described above, in order to provide high precision control, an important aspect to be considered is the time granularity (precision) for the measurement of the wait time between the successive transmitted packets. As an example, FIG. 4 shows the absolute percentage error E (logarithmic scale) on the specified (target) bandwidth $B_T$ for a given transmission at bandwidth up to 10 Mbps, with a packet size of 8 KB. The upper curve shows the error with rounding of the wait time to the millisecond and the lower curve shows the error using rounding of the wait time to the microsecond. It can be seen that when the rounding is to the microsecond (higher precision) the error is less.

Figure 5:
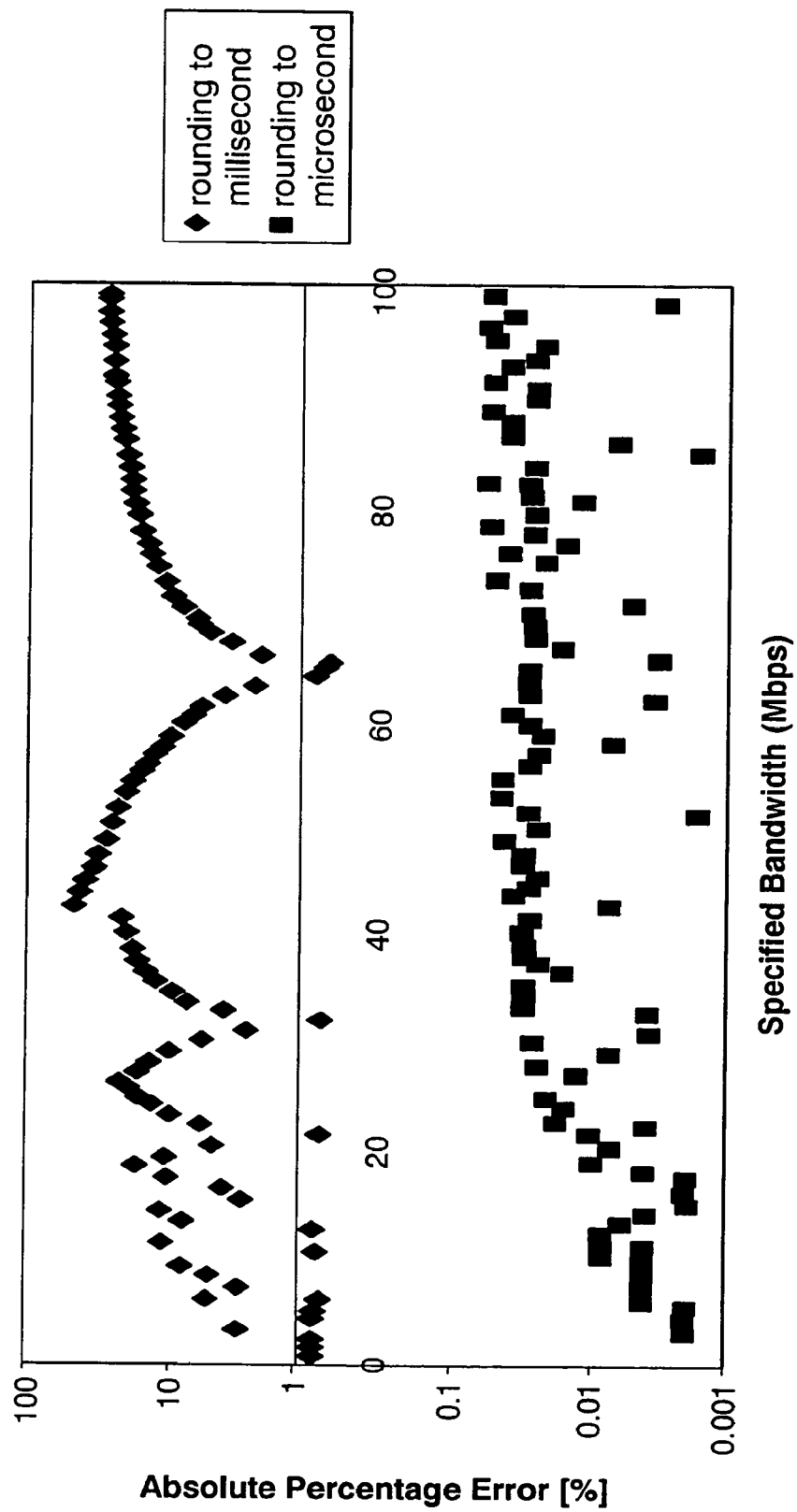
FIG. 5 is a diagram showing the percentage error relative to a specified target bandwidth for an exemplary transmission bandwidth of above 100 Mbps.

FIG. 5 shows, as an example, the absolute percentage error E (logarithmic scale) on the specified target bandwidth $B_T$ for a given transmission at a bandwidth up to 100 Mbps, with a packet size of 8 KB. The upper curve shows the error with rounding of the wait time to the millisecond and the lower section shows rounding of the wait time to the microsecond. It can be seen that the percentage error E in actual bandwidth usage never exceeds 0.1%. By rounding the wait time to the millisecond the resulting error is significantly greater; the actual bandwidth usage would be 45-50% higher than the target bandwidth at a $B_T$ of 50 Mbps and 35% lower at $B_T$=100 Mbps.

Figure 6:
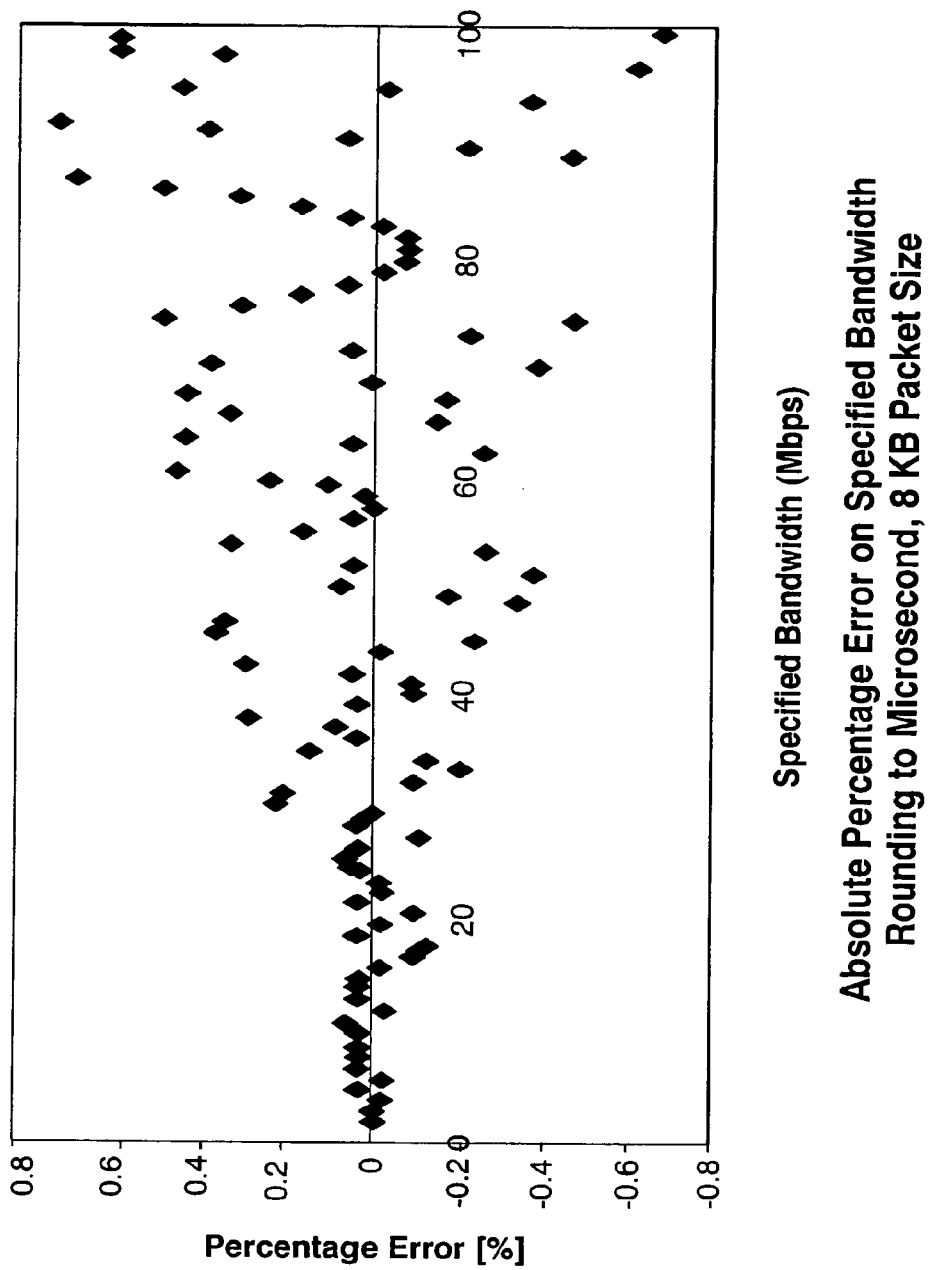
FIG. 6 is a diagram showing the percentage error relative to a specified target bandwidth for an exemplary transmission bandwidth of up to 1 Gbps.

FIG. 6 shows the percentage error E on the specified bandwidth $B_T$ for a given exemplary transmission (up to 1 Gbps), when rounding the wait time between the packets of the transmission to the microsecond, where the packet size=8 KB. The percentage error obtained when rounding to the millisecond is not shown on this graph. By rounding the wait time to the microsecond, the percentage error on the target bandwidth $B_T$ up to 1 Gbps remains under 0.8% in the worst case. This means that the difference between mean bandwidth $B_M$ and target bandwidth $B_T$ would be under 8 Mbps. This might be considered to be acceptable for transmission speeds up to 1 Gbps. But using the 1 microsecond granularity would yield much higher and unacceptable errors for target bandwidths even significantly lower than 1 Gbps.

The packet size (P) plays an important role during transmission. In general, the larger the packet size, the smaller the percentage error of the target bandwidth $B_T$ relative to the mean bandwidth $B_M$, when there is rounding to at least the precision of a microsecond. This is due to the fact that if the packet size is increased, the number of packets for a given transmission content decreases and, consequently, the number of wait time occurrences between the packets of a given transmission decreases, causing the rounding error sum to decrease.

In the invention, the bandwidth in a transmission is controlled by selecting and placing wait time intervals $t_w$ of a predetermined value between packets. It is preferred that the wait time interval $t_w$ be computed with the highest precision possible on the sender device by using the highest resolution timing device available. As demonstrated above, at least microsecond granularity is preferable to guarantee an acceptable bandwidth control for transmission speeds in the Mbps range.

The algorithm applied to achieve the bandwidth control is as follows:

given the target bandwidth $B_T$ and the packet size P, the wait time interval $t_w$ between every packet is:

$$t_w = \frac{P}{B_T} \quad \text{(Equation 2-1)}$$

In operation, both $B_T$ and P are provided as input parameters to the computer that controls the transmission. The target bandwidth $B_T$ can be set by the person who wants to send a transmission through a user interface. For example, if one wants to send a content to a third person, a program can be made available where the "speed" at which the file is to be transmitted is entered by the user. That is, the target bandwidth $B_T$ is given as an input parameter.

As to the packet size P parameter, typically the packet size is set when a program is installed to broadcast the transmissions, and then packet size is kept the same for all transmissions. The packet size can be, for example, contained in a configuration file. It also can be input as a separate parameter. In a typical use, the content to be sent and the target transmission bandwidth $B_T$ are selected. Then the broadcast application reads the needed packet size P from the configuration settings, which was previously set by the broadcast application or was input. At this point, the broadcast application "fragments" the file to be transmitted into smaller packets. Typically, the header of these packets will specify the address of the receiver and information about the packet content. The broadcast application already knows the packet size, since it was read from the configurations or from the input before fragmenting the content to be transmitted into packets.

In use, the target bandwidth $B_T$ selected for use with a broadcast application program is largely based on the transmission media to be used and other factors, such as the amount of bandwidth leased or purchased for use.

During the transmission of the packets a loop operation is repeated for every packet transmission as follows:

(1) obtain the actual time value $t_1$ (as start of packet transmission);

(2) send the packet;

(3) obtain the actual time value $t_2$ (after packet transmission);

(4) compute the time used to send the packet $t_{used}$, where $$t_{used} = t_2 - t_1 \quad \text{(Equation 2-2)}$$

(5) compute a value t (residual time)

$$t = t_w - t_{used} \quad \text{(Equation 2-3)}$$

(6) Wait for t;

(7) go to step 1.

Figure 7:
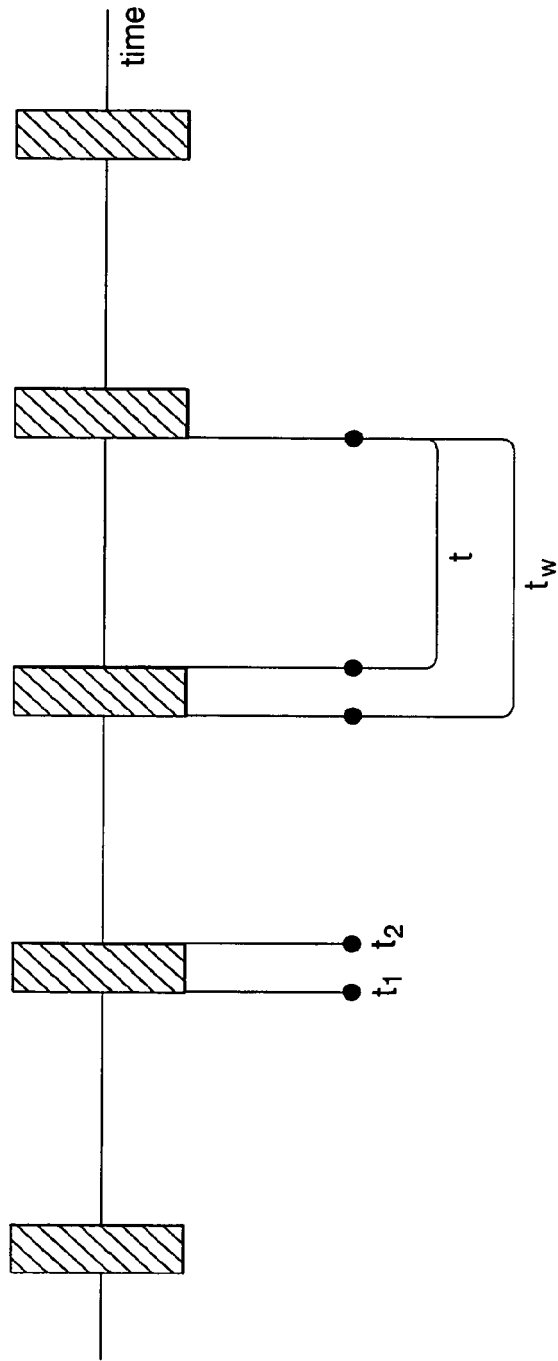
FIG. 7 is a diagram showing various time relationships between packets.

Referring to FIG. 7, this shows the various times. As seen, $t_w$ is the time between the start ($t_1$) of two successive packets, while t is the time between the end ($t_2$) of one packet and the start ($t_1$) of the next packet. The residual time value t must be respectively based on the selected packet size P and target bandwidth $B_T$.

The operation to send a packet of data is time consuming. That is, time $t_{used}$ will be used to physically take a packet and send it on the network. To ensure that there is sufficient time for the wait time $t_w$ to be achieved, the sender device needs to wait a residual time t after the send packet operation is completed. The computed wait time $t_w$ between packets ensures that information will be sent at the needed target bandwidth. That is, the residual time t is the difference between $t_w$ (wait between successive packets) and $t_{used}$ (to send a packet).

FIG. 1 is a diagram that explains the transmission of the data packets. At the sending station there is a computer 10 that has a broadcast application program installed. The broadcast application program operates on a content 12 that is to be transmitted in data packets. The parameters of the transmission target bandwidth $B_T$ and packet size P are input to the computer 10. As explained above, the value P of the packet size might already be known in the computer. It can be set if required. The computer computes the wait time $t_w$ from the algorithm of Equation 2-1 and operates to control the transmission 16 of packets 18 (black bars), shown as having a controlled wait time $t_w$ between the successive packets.

The packets 18 are received at a computer 20 that has a receiving application program installed. This program reassembles the received packets into a file that corresponds to the content file 12 that was sent. This is conventional.

Figure 2:
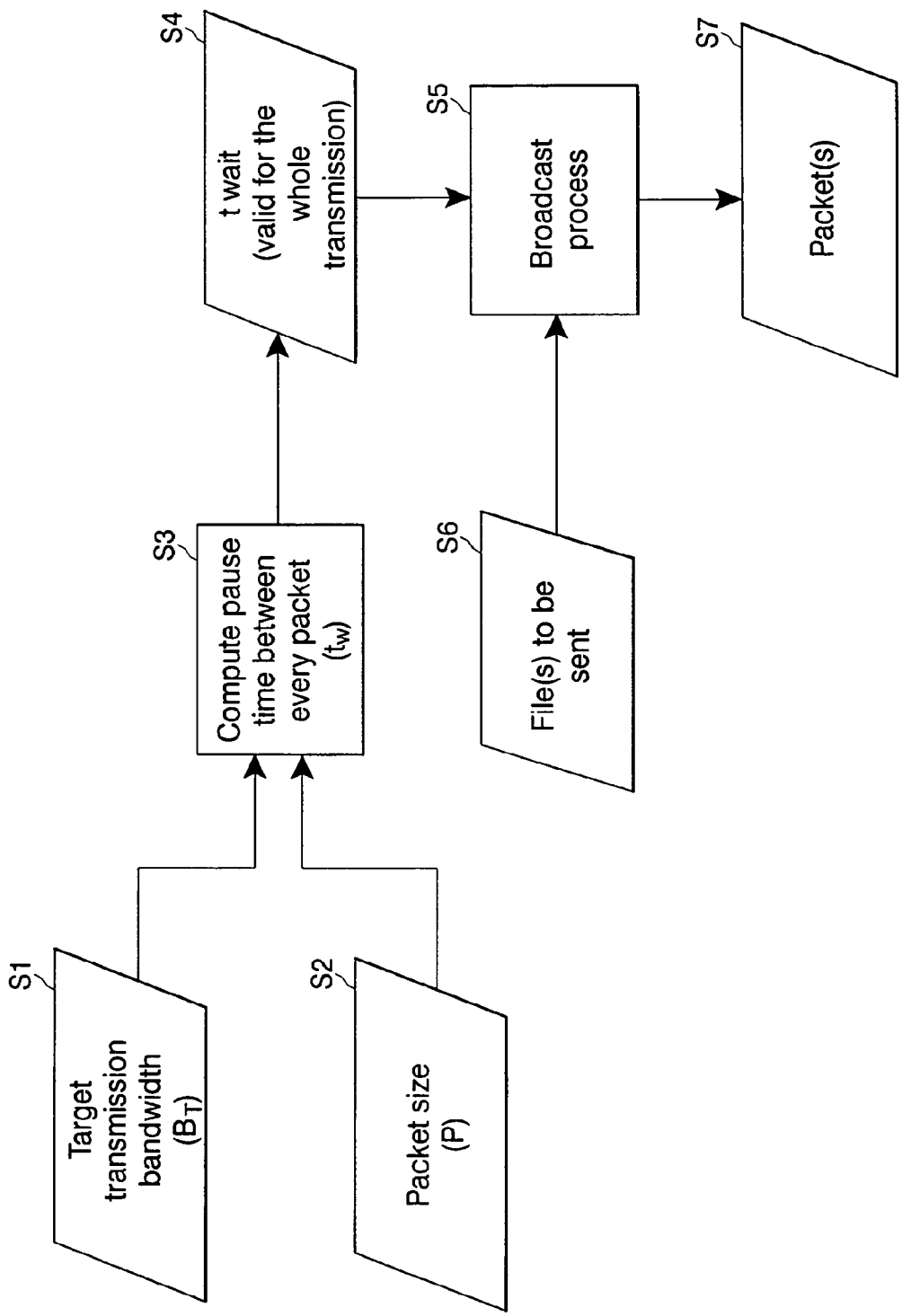
FIG. 2 is a flow chart of the process.

FIG. 2 is a flow chart of the overall process. Here, in S1 and S2 the target bandwidth $B_T$ and packet size P are input to the computer. In S3, the computer computes $t_w$ in accordance with the algorithm of equation 2-1. The computed value $t_w$ is used as a control parameter in S4 that is input to the broadcast application process S5. The $t_w$ value is applied to the file to be sent as input at S6 to the broadcast process S5. The broadcast process S5 knowing the packet size from S2 and the wait time $t_w$ from S3 transmits the S7 packets.

Figure 3:
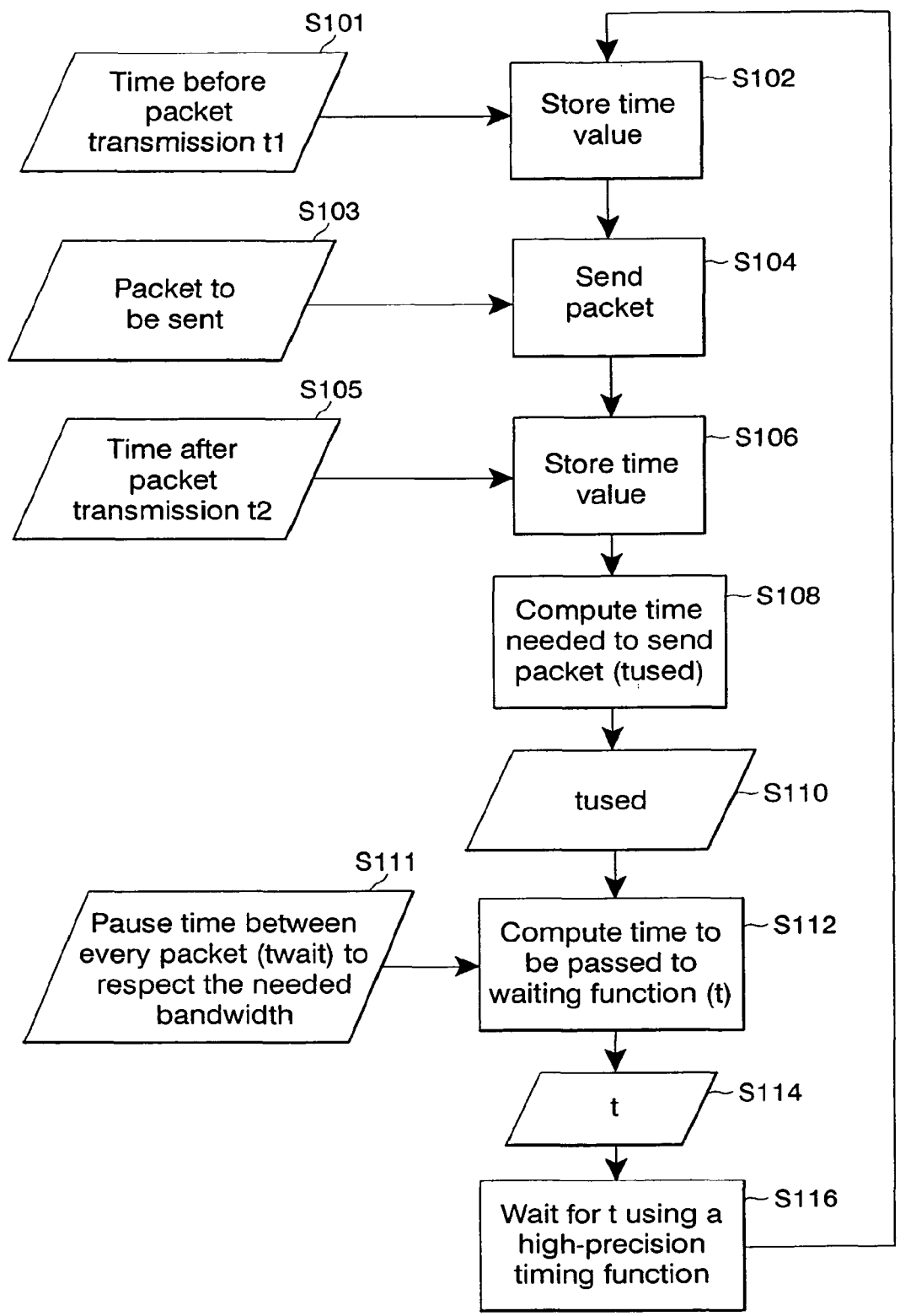
FIG. 3 is a flow chart showing the generation of various timing functions.

FIG. 3 shows the operation of the computer in performing the steps of the timing loop to obtain the residual time t as referred to above. At S101, the time $t_1$ at the start of transmission of a packet is determined and stored in S102. In S103, the packet to be sent is made available and is sent in S104. In S105, the end time $t_2$ of the transmission of the packet is determined and is stored in S106. In S108, the time quantity $t_{used}$ in transmitting the packet is computed (S106 value minus S102 value) and is made available in S110.

In S111, the computed value of $t_w$ (see S4) is used in S112 with $t_{used}$ (from S110) to compute the residual time t (see Equation 2-3). The computed value of the residual time t is available in S114 as a time to be satisfied in S116 before transmission of the next packet is started at S101 and S102. The loop of FIG. 3 is repeated for each packet sent.

Using the algorithm of Equation 2-1 it is preferred that the facilities used to get the current time values $t_1$ and $t_2$ of Equation 2-2 and to wait for the residual time t of Equation 2-3 have at least microsecond granularity (precision or resolution). Making the granularity more precise decreases the error E of the actual mean bandwidth $B_M$ relative to the target bandwidth $B_T$. The most direct method to obtain the $t_1$ and $t_2$ values would be to get the actual time from the operating system, such as from its timing clock. However, this would imply that the operating system has a timer of microsecond precision. In the absence of this facility, a high precision hardware counter could be used. A counter is a general term used in programming to refer to an incrementing variable. Some systems include a high-resolution performance counter that provides high-resolution elapsed times. The counter values are managed by the computer central processing unit (CPU) and read by the operating system. Usually, the counter must be hardware controlled in a CPU-sharing operating system if other tasks, in addition to time computation, are carried out. If the increasing frequency of the counter, i.e., how many times in a second the count is increased, is known, it is possible to compute a time interval such as $t_{used}$ by obtaining the counter value at two different times and dividing this difference by the counter frequency. As seen, it is desirable to use a high precision counter. Any reliable counter can be used, however, the highest resolution counter available on the device should be used in order to maximize the precision with which bandwidth is controlled.

Another key issue is how to suspend the program that sends the packets for a given residual time interval t. As shown above, after a packet is transmitted, the program must wait for the residual time $t=t_w-t_{used}$ to have elapsed before sending another packet. If the broadcasting device does not have the necessary hardware and/or software facilities to accomplish the task of determining the residual time with the desired granularity, but provides at least a method to know the current time with the desired granularity, then other approaches can be used.

Figure 8:
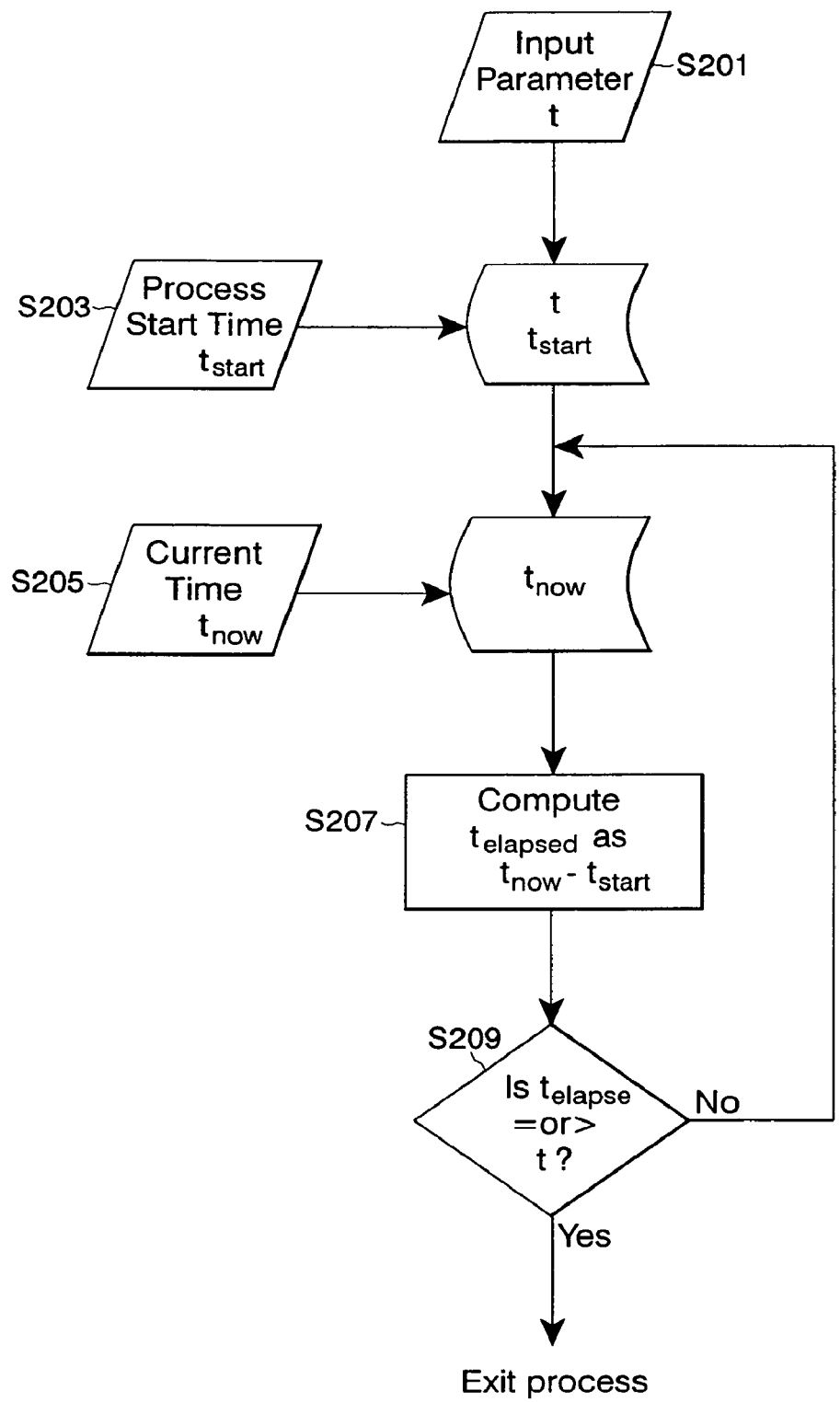
FIG. 8 is a flow chart showing an alternate function for producing wait time of a fixed value between the start of sending of successive packets.

One approach, is shown in FIG. 8. Here the residual time t is supplied at step S201 and the determined value of $t_{start}$ (start of the $t_w$ function) and $t_{now}$ (present time) are provided at S203 and S205. A time $t_{elapsed}$ is computed in S207 as:

$$t_{elapsed}=t_{now}-t_{start} \quad \text{(Equation 3-1)}$$

A function (i.e., a software process) is implemented which, periodically, in a loop, compares in S209 the values of the difference between $t_{elapsed}$ and the residual time t to wait before the next packet is sent. When the value of $t_{elapsed}$ is equal or greater than the desired residual time t, the looping process ends and lets the program continue, sending a new packet. This approach provides high precision if the time measurements have high precision and the appropriate values, described below, are compared at frequent intervals.

The method of FIG. 8 can be described in an algorithm as follows:

S201 Get the desired residual time t (i.e., the how long the sending of packets must be suspended);

S203 Get the start time $t_{start}$ (when the wait process is called);

Continue performing the following loop as often as possible:

S205 Get the current time $t_{now}$;

S207 Compute $t_{now}-t_{start}=t_{elapsed}$.

When $t_{elapsed}$ is greater than or equal to t (S209), then exit the loop and let the program continue running.

When the process exits the loop, it means that $(t_{now}-t_{start})$ is greater or equal to the residual time t. Otherwise, the loop keeps on running. In some cases, it can happen that $t_{elapsed}$ $(t_{now}-t_{start})$ is greater than the residual time t, that is, the process waited longer than the residual time t.

Figure 9:
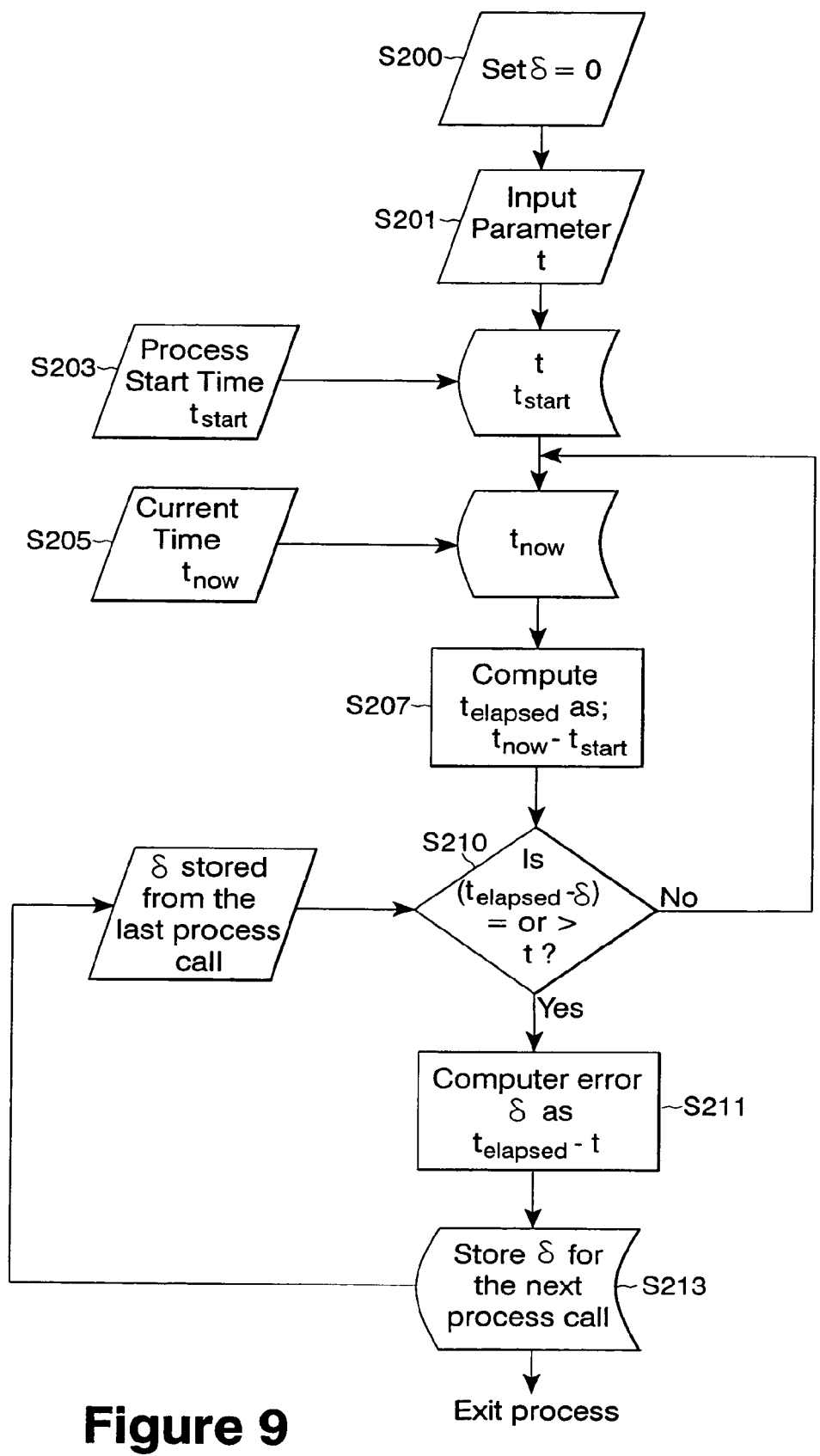
FIG. 9 is a modification of the function of FIG. 8 introducing an error compensation mechanism.

An improvement of the process of FIG. 8 is shown in FIG. 9, in which the same steps used in the FIG. 8 process are shown with the same reference numerals. In the process of FIG. 9, the small difference δ which can occur between $t_{elapsed}$ and the residual time t is considered in each call of the process. First, the value of δ is set to zero in S200. Step S211 is added to the FIG. 8 process in which δ is computed. That is:

$$\delta=t_{elapsed}-t \quad \text{(Equation 3-2)}$$

The value δ is stored in S213 for the next process call and subtracted in S210 from the next residual time t (passed as input to the process at the next call of starting the next $t_w$ cycle).

The process of FIG. 9 dynamically compensates the rounding error by modifying the residual time t with the error δ. In this way, the time spent between sending one packet and the next tends toward $t_w$ on the average, notwithstanding errors caused by rounding. The errors introduced in one cycle are compensated for in the subsequent cycles. With this correction, if the wait time $t_w$ between packets (computed from P and $B_T$), which was in the process of FIG. 8 held constant during the entire transmission, changes dynamically in order to compensate for previous errors. During this period of error compensation the instantaneous bandwidth usage can exceed the target bandwidth $B_T$.

This process of error correction process reduces the precision of the instantaneous bandwidth used in order to increase the precision of the mean bandwidth $B_M$ used. The period for which the instantaneous bandwidth used exceeds the target bandwidth $B_T$ depends on the rounding errors described above. The use of a high resolution clock or counter will limit this period. For this reason, this correction should be implemented only if it is possible and acceptable to exceed the target bandwidth for brief periods. This completes the bandwidth control process.

Considering the burstiness situation, it should be understood that if the timing rounding errors are not compensated, then the lowest possible limit to the burstiness is limited using the timing facilities provided by the sending device, but the average bandwidth may be lower than the target bandwidth $B_T$. If the timing rounding errors are compensated, then the average bandwidth is as close as is possible to the target bandwidth using the timing facilities provided by the sending device, but the burstiness is greater than if error correction was not used.

Reliable protocols such as Transmission Control Protocol (TCP) send additional packets for acknowledgement of receipt, and retransmission of lost or corrupted data packets. The sender device cannot typically determine the number or size of additional packets sent, and so cannot control the bandwidth used. For this reason the invention is of significant benefit principally when used with unreliable packet based protocols.

The bandwidth control method and system of the invention can be applied to contents of whatever size. It is not necessary for the sender to know content size a priori. The only knowledge required up front is the size of the packets hereafter designated as P, and the target bandwidth. The content size only affects the transmission duration, and not the average bandwidth, if the process and/or device used to wait for the paresidual time between the packets is precise enough.

The method and system of the invention can be used in conjunction with existing traffic shaping solutions. Consider a network with many sender devices, many receiver devices and a traffic shaper between senders and receivers. If one or more of the sender devices produce bursty traffic, the traffic shaper will intervene to contain the resulting congestion by discarding packets. The introduction of the invention at one or more of the sender devices will reduce the burstiness of the output streams and so reduce the likelihood of congestion and packet loss.

Specific features of the invention are shown in one or more of the drawings for convenience only, as each feature may be combined with other features in accordance with the invention. Alternative embodiments will be recognized by those skilled in the art and are intended to be included within the scope of the claims.

We claim:

1. A method, performed by a computer having a memory and a processor, for transmitting data as successive packets each having a fixed packet size, the method comprising:
   selecting a target bandwidth sought to be achieved during the transmission of the successive packets;
   determining a wait time between transmit starting times of successive packets of the transmission based on the target bandwidth and the packet size; and
   with the computer, controlling the transmission of the packets using the determined wait time comprising:
   (a) determining the time used in the transmission of a packet; and
   (b) determining a residual time based on the difference between the time used and the wait time.

2. The method of claim 1 wherein the determined wait time is rounded to a time unit.

3. The method of claim 2 wherein the time unit is a millisecond.

4. The method of claim 2 wherein the time unit is a microsecond.

5. The method of claim 2 wherein the rounding to the time unit is accomplished by a counter.

6. The method of claim 1, wherein controlling the transmission of the packets further comprises:
   (c) beginning transmission of the next packet approximately at a time obtained by adding the residual time to the time at which transmission of the previous packet is complete; and
   (d) repeating steps (a), (b), and (c) for each packet transmitted.

7. The method of claim 1, wherein controlling the transmission of the packets further comprises:
   (c) determining a start time;
   (d) determining a current time;
   (e) determining an elapsed time based on the difference between the determined start time and the determined current time; and
   (f) repeating steps (d) and (e) until the elapsed time is greater than or equal to the residual time.

8. The method of claim 7, wherein controlling the transmission of the packets further comprises:
   (g) determining an error value based on the determined elapsed time and the residual time; and
   (h) subtracting the error value from a later determined elapsed time.

9. The method of claim 1, further comprising:
   selecting the packet size of the packets to be transmitted.

10. The method of claim 1 wherein the packet size is provided by an application.

11. A method, performed by a computer having a memory and a processor, for transmitting data as successive packets each having a fixed packet size, the method comprising:
    selecting a target bandwidth sought to be achieved during a transmission of successive packets;
    determining a wait time between transmit starting times of successive packets based upon the packet size and the target bandwidth; and
    with the computer, controlling the transmission of the successive packets so that there is a residual time between the ending time of transmission of a first packet of the successive packets and the starting time of transmission of the next packet of the successive packets wherein controlling the transmission of the successive packets comprises:
    determining the time used in the transmission of the first packet of the successive packets;
    determining the residual time based on the difference between the wait time and the time used; and
    beginning transmission of the next packet approximately at a time obtained by adding the residual time to the time at which transmission of the previous packet is complete.

12. The method of claim 11, further comprising:
    rounding the wait time to a time unit; and
    adjusting the residual time to compensate for errors caused by the rounding.

13. The method of claim 11, wherein controlling the transmission of the successive packets further comprises:
    (a) determining a start time;
    (b) determining a current time;
    (c) determining an elapsed time based on the difference between the determined start time and the determined current time; and
    (d) repeating steps (b) and (c) until the elapsed time is greater than or equal to the residual time.

14. A device, having a memory and a processor, for transmitting data as successive packets each having a fixed packet size, the device comprising:
- a first component configured to select a target bandwidth sought to be achieved during the transmission of the successive packets;
- a second component configured to determine a wait time between transmit starting times of successive packets of the transmission based on the target bandwidth and the packet size; and
- a third component configured to control the transmission of the packets using the determined wait time by:
  - (a) determining the time used in the transmission of a packet; and
  - (b) determining a residual time based on the difference between the time used and the wait time, wherein at least one of the components comprises computer-executable instructions stored in memory for execution by the device.

15. The device of claim 14, the third component being configured to control the transmission of the packets by further:
- (c) beginning transmission of the next packet approximately at a time obtained by adding the residual time to the time at which transmission of the previous packet is complete; and
- (d) repeating steps (a), (b), and (c) for each packet transmitted.

16. The device of claim 14, the third component being configured to control the transmission of the packets by further:
- (c) determining a start time;
- (d) determining a current time;
- (e) determining an elapsed time based on the difference between the determined start time and the determined current time; and
- (f) repeating steps (d) and (e) until the elapsed time is greater than or equal to the residual time.

17. The device of claim 16, the third component being configured to control the transmission of the packets by further:
- (g) determining an error value based on the determined elapsed time and the residual time; and
- (h) subtracting the error value from a later determined elapsed time.

18. The device of claim 14, further comprising:
- a fourth component configured to adjust the transmission time of the packets to compensate for any rounding errors.

19. A method of controlling the wait time ($t_w$) between the starting time of transmission of each of successive packets of known packet size (P) of content to be transmitted to achieve a target bandwidth ($B_T$) during the transmission comprising:
- selecting a target bandwidth ($B_T$) sought to be achieved during the transmission;
- computing a wait time ($t_w$) between the starting time of the successive packets of the transmission using the algorithm $$t_w = \frac{P}{B_T}; \text{ and}$$

controlling the transmission of the packets so that there is a residual time (t) between the ending time of transmission of a first packet and the starting time of transmission of the next packet to establish the wait time ($t_w$), wherein controlling the transmission comprises,
- (a) determining a time used ($t_{used}$) in the transmission of the first packet, wherein determining $t_{used}$ comprises,
  - determining the starting time $t_1$ of transmission of the first packet,
  - determining the ending time $t_2$ of transmission of the first packet, and
  - determining the time used $t_{used}$ in transmitting the first packet as $t_2-t_1$, and
- (b) waiting the residual time t between the ending time of transmission of the first packet to the starting time of transmission of the next packet.

20. A method of controlling the wait time ($t_w$) between the starting time of transmission of each of successive packets of known packet size (P) of content to be transmitted to achieve a target bandwidth ($B_T$) during the transmission comprising:
- selecting a target bandwidth ($B_T$) sought to be achieved during the transmission;
- computing a wait time ($t_w$) between the starting time of the successive packets of the transmission using the algorithm $$t_w = \frac{P}{B_T}; \text{ and}$$

controlling the transmission of the packets so that there is a residual time (t) between the ending time of transmission of one packet and the starting time of transmission of the next packet to establish the wait time ($t_w$), wherein controlling the transmission comprises,
- determining a value of starting time ($t_{start}$) of a wait process and a current time $t_{now}$, and
- performing a loop operation of:
  - (a) computing a time $t_{elapsed}=t_{now}-t_{start}$, and
  - (b) comparing $t_{elapsed}$ to the residual time t and transmitting the next packet when the value of $t_{elapsed} \geq t$.

21. The method of claim 20, further comprising:
computing an error value $\delta=t_{elapsed}-t$ and subtracting the value $\delta$ from a later supplied value of t.

22. A method of controlling the wait time ($t_w$) between the starting time of transmission of each of successive packets of known packet size (P) of content to be transmitted to achieve a target bandwidth ($B_T$) during the transmission comprising:
- selecting a target bandwidth ($B_T$) sought to be achieved during the transmission;
- selecting the known packet size (P) of the content to be transmitted;
- computing a wait time ($t_w$) between the starting time of the successive packets of the transmission using the algorithm $$t_w = \frac{P}{B_T}; \text{ and}$$

controlling the transmission of the packets so that there is a residual time (t) between the ending time of transmission of one packet and the starting time of transmission of the next packet to establish the wait time ($t_w$).

23. A method of controlling the wait time ($t_w$) between the starting time of transmission of each of successive packets of known packet size (P) of content to be transmitted to achieve a target bandwidth ($B_T$) during the transmission comprising:

selecting a target bandwidth ($B_T$) sought to be achieved during the transmission;

computing a wait time ($t_w$) between the starting time of the successive packets of the transmission using the algorithm $$t_w = \frac{P}{B_T},$$

wherein the known packet size (P) is provided by an application; and controlling the transmission of the packets so that there is a residual time (t) between the ending time of transmission of a first packet and the starting time of transmission of the next packet to establish the wait time ($t_w$).

24. An apparatus for controlling the transmission of successive packets of known packet size (P) of content to be transmitted to achieve a target bandwidth ($B_T$) during the transmission comprising:

a computer including:

a program to control transmission of content in packets of data;

means to input and receive parameters of the size (P) of each of the packets to be transmitted and of the desired target bandwidth ($B_T$);

means for determining the starting time ($t_1$) of transmission of a packet;

means for determining the ending time ($t_2$) of transmission of the packet;

means for determining the time used ($t_{used}$) in transmitting the packet as ($t_2 - t_1$); and control means to transmit the successive packets to have a residual time (t) between the ending time of transmission of one packet and the starting of transmission of the next successive packet to achieve a wait time $t_w$ between the packets such that $$t_w = \frac{P}{B_T},$$

wherein said control means operates based on the determined $t_{used}$ to wait the residual time t between the ending time of transmission of one packet to the starting time of transmission of the next packet.

25. An apparatus for controlling the transmission of successive packets of known packet size (P) of content to be transmitted to achieve a target bandwidth ($B_T$) during the transmission comprising:

a computer including:

a program to control transmission of content in packets of data;

means to input and receive parameters of the size (P) of each of the packets to be transmitted and of the desired target bandwidth ($B_T$);

first means for determining the time used ($t_{used}$) in the transmission of a packet; and control means to transmit the successive packets to have a residual time (t) between the ending time of transmission of one packet and the starting of transmission of the next successive packet to achieve a wait time $t_w$ between the packets such that $$t_w = \frac{P}{B_T},$$

wherein said control means operates based on the determined $t_{used}$ to wait the residual time t between the ending time of transmission of one packet to the starting time of transmission of the next packet based on computing $t_w - t_{used}$.

26. An apparatus for controlling the transmission of successive packets of known packet size (P) of content to be transmitted to achieve a target bandwidth ($B_T$) during the transmission comprising:

a computer including:

a program to control transmission of content in packets of data;

means to input and receive parameters of the size (P) of each of the packets to be transmitted and of the desired target bandwidth ($B_T$);

control means to transmit the successive packets to have a residual time (t) between the ending time of transmission of one packet and the starting of transmission of the next successive packet to achieve a wait time $t_w$ between the packets such that $$t_w = \frac{P}{B_T}; \text{ and}$$

means for controlling the residual time t by determining a value of starting time $t_{start}$, and a current time $t_{now}$ and performing a loop operation of:

(a) computing a time $t_{elapsed} = t_{now} - t_{start}$, and (b) comparing $t_{elapsed}$ to the residual time t and transmitting the next packet when the value of $t_{elapsed} \geq t$.

27. The apparatus of claim 26 further comprising means for computing an error value $\delta = t_{elapsed} - t$ and subtracting the value $\delta$ from a later supplied value of t.

* * * * *

UNITED STATES PATENT AND TRADEMARK OFFICE
CERTIFICATE OF CORRECTION

| | | |
|---|---|---|
| PATENT NO. | : 8,175,117 B2 | |
| APPLICATION NO. | : 12/269023 | |
| DATED | : May 8, 2012 | |
| INVENTOR(S) | : Marchetto et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
Eleventh Day of September, 2012

David J. Kappos
*Director of the United States Patent and Trademark Office*

UNITED STATES PATENT AND TRADEMARK OFFICE
CERTIFICATE OF CORRECTION

PATENT NO.        : 8,175,117 B2
APPLICATION NO.   : 12/269023
DATED             : May 8, 2012
INVENTOR(S)       : Marchetto et al.

It is certified that error appears in the above-identified patent and that said Letters Patent is hereby corrected as shown below:

In Column 3, Line 17, delete "distorted" and insert -- distorted. --, therefor.

In Column 14, Line 3, in Claim 19, delete "($t_{used}$))" and insert -- ($t_{used}$) --, therefor.

Signed and Sealed this
Second Day of October, 2012

David J. Kappos
*Director of the United States Patent and Trademark Office*